US010670180B2

United States Patent
Pan et al.

(10) Patent No.: US 10,670,180 B2
(45) Date of Patent: Jun. 2, 2020

(54) GIMBAL STRUCTURE AND GEAR ADJUSTING MECHANISM THEREOF

(71) Applicant: SZ DJI OSMO TECHNOLOGY CO., LTD., Shenzhen (CN)

(72) Inventors: Paul Pan, Shenzhen (CN); Hao Liu, Shenzhen (CN); Tao Zhao, Shenzhen (CN); Min Kim, Shenzhen (CN); Yanchong Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/561,936

(22) Filed: Sep. 5, 2019

(65) Prior Publication Data

US 2019/0390818 A1   Dec. 26, 2019

Related U.S. Application Data

(63) Continuation of application No. 16/167,447, filed on Oct. 22, 2018, now Pat. No. 10,428,998, which is a
(Continued)

(51) Int. Cl.
*G03B 39/00* (2006.01)
*F16M 11/16* (2006.01)
(Continued)

(52) U.S. Cl.
CPC ........... *F16M 11/16* (2013.01); *F16M 11/048* (2013.01); *F16M 11/105* (2013.01);
(Continued)

(58) Field of Classification Search
CPC .... G03B 17/561; G03B 17/563; F16M 13/04; F16M 11/02
(Continued)

(56) References Cited

U.S. PATENT DOCUMENTS

| 5,065,249 A | * | 11/1991 | Horn | ...................... | F16M 11/10 |
| | | | | | 348/375 |
| 6,530,702 B2 | * | 3/2003 | Harris | .................... | F16M 13/04 |
| | | | | | 348/157 |

(Continued)

FOREIGN PATENT DOCUMENTS

| CN | 201804197 U | 4/2011 |
| CN | 202939404 U | 5/2013 |
| CN | 203258324 U | 10/2013 |
| CN | 203594946 U | 5/2014 |
| EP | 1939587 A2 | 7/2008 |
| EP | 2743559 A2 | 6/2014 |

(Continued)

OTHER PUBLICATIONS

The World Intellectual Property Organization (WIPO) International Search Report for PCT/CN2014/081054 dated Jan. 4, 2015 pp. 8.

*Primary Examiner* — Todd M Epps
(74) *Attorney, Agent, or Firm* — Anova Law Group, PLLC (57) ABSTRACT

A quick release mechanism includes a rotating member, a slider, and a screw connecting the slider with the rotating member. The rotating member is configured to be arranged on a first side of a first gimbal support frame of a gimbal. The slider is configured to be arranged on a second side of the first gimbal support frame that is opposite to the first side, and between the first gimbal support frame and a second gimbal support frame of the gimbal. The screw is configured to penetrate the first gimbal support frame, drive the slider to move in a first direction to abut between the first gimbal support frame and the second gimbal support frame, and drive the slider to move in a second direction opposite to the first direction to be released from the first gimbal support frame and the second gimbal support frame.

20 Claims, 5 Drawing Sheets

Related U.S. Application Data continuation of application No. 15/390,761, filed on Dec. 27, 2016, now Pat. No. 10,107,446, which is a continuation of application No. PCT/CN2014/081054, filed on Jun. 27, 2014.

(51) Int. Cl.

| | | |
|---|---|---|
| *F16M 11/04* | (2006.01) | |
| *F16M 11/18* | (2006.01) | |
| *F16M 11/20* | (2006.01) | |
| *F16M 11/24* | (2006.01) | |
| *F16M 13/04* | (2006.01) | |
| *F16M 11/10* | (2006.01) | |
| *G03B 17/56* | (2006.01) | |

(52) U.S. Cl.
CPC ........... *F16M 11/18* (2013.01); *F16M 11/205* (2013.01); *F16M 11/24* (2013.01); *F16M 13/04* (2013.01); *G03B 17/561* (2013.01); *G03B 17/563* (2013.01); *F16M 2200/041* (2013.01)

(58) Field of Classification Search
USPC ................ 248/292.11; 396/428, 12; 352/243
See application file for complete search history.

(56) References Cited

U.S. PATENT DOCUMENTS

| | | | | |
|---|---|---|---|---|
| 6,988,802 | B2* | 1/2006 | Harris | .................... F16M 13/04 352/243 |
| 10,107,446 | B2* | 10/2018 | Pan | ...................... F16M 11/105 |
| 10,428,998 | B2* | 10/2019 | Pan | ........................ F16M 11/16 |
| 2004/0223078 | A1 | 11/2004 | Zadok | |
| 2005/0041966 | A1 | 2/2005 | Johnson | |
| 2007/0252068 | A1 | 11/2007 | Secora | |
| 2009/0189048 | A1* | 7/2009 | Gan | ........................ F16M 11/24 248/422 |
| 2014/0064719 | A1 | 3/2014 | Harris | |
| 2014/0161434 | A1 | 6/2014 | Koymen | |
| 2017/0108162 | A1 | 4/2017 | Pan et al. | |
| 2017/0108761 | A1 | 4/2017 | Pan et al. | |
| 2017/0115551 | A1 | 4/2017 | Pan et al. | |
| 2017/0227834 | A1 | 8/2017 | Zhao et al. | |
| 2017/0301230 | A1 | 10/2017 | Liu et al. | |

FOREIGN PATENT DOCUMENTS

| | | |
|---|---|---|
| JP | H09315793 A | 12/1997 |
| JP | 2006317945 A | 11/2006 |
| JP | 2007219197 A | 8/2007 |
| JP | 2015519612 A | 7/2015 |
| WO | 0076732 A1 | 12/2000 |

* cited by examiner

GIMBAL STRUCTURE AND GEAR ADJUSTING MECHANISM THEREOF

CROSS-REFERENCE TO RELATED APPLICATION

This application is a continuation of application Ser. No. 16/167,447, filed on Oct. 22, 2018, which is a continuation application of application Ser. No. 15/390,761, filed on Dec. 27, 2016, no U.S. Pat. No. 10,107,446, which is a continuation application of International Application No. PCT/CN2014/081054, filed on Jun. 27, 2014, the entire contents of all of which are incorporated herein by reference.

TECHNICAL FIELD

The present disclosure relates to a supporting structure for optical devices, and particularly to a gimbal structure for supporting optical devices and a gear adjusting mechanism thereof.

BACKGROUND OF THE DISCLOSURE

A gimbal structure may be used to support an optical device such as a video camera, a camera, a telescope, a telescope video camera, a measuring instrument, or the like. Operations of such an optical device may require the gimbal structure to stably support the optical device and to easily adjust an orientation thereof.

The center of gravity of a gimbal structure may need to be adjusted to point a camera at different shooting angles. In conventional technologies, the center of gravity of a gimbal structure may be adjusted by first sliding a supporting plate on which the camera is fixed along a roll-axis support which carries the supporting plate, and then locking the supporting plate on the roll-axis support by a screw. However, a specific tool has to be used in this center of gravity adjusting method and the center of gravity of the gimbal structure may not be adjusted in a timely and convenient manner.

SUMMARY

In view of the problems in the conventional technologies, there is a need to provide a gimbal structure capable of adjusting the center of gravity in a timely manner without the aid of tools, and a gear adjusting mechanism thereof.

In accordance with the present disclosure, there is provided a gimbal structure including a support frame and a center of gravity adjusting device connected to the support frame. The support frame includes a roll-axis support, a yaw-axis vertical bar connected to the roll-axis support, and a yaw-axis horizontal bar carried on the yaw-axis vertical bar. The center of gravity adjusting device is configured to slide the yaw-axis horizontal bar relative to the yaw-axis vertical bar to adjust a center of gravity of the gimbal structure. The center of gravity adjusting device includes a quick release mechanism including a quick release buckle arranged on one side of the yaw-axis vertical bar, a slider arranged between the yaw-axis vertical bar and the yaw-axis horizontal bar, and a screw connecting the slider with the quick release buckle. The center of gravity adjusting device is configured to be locked when the quick release buckle is fastened and the slider is abutted between the yaw-axis vertical bar and the yaw-axis horizontal bar, and to be adjustable when the quick release buckle is unfastened and the slider is released from the yaw-axis vertical bar and the yaw-axis horizontal bar.

In some embodiments, the quick release buckle includes a rotating shaft having a cylindric structure and a rotating body having a cylindric structure. The rotating body is sleeved on an outer peripheral of the rotating shaft. A circle center of the rotating body is spaced apart from a circle center of the rotating shaft.

In some embodiments, the quick release buckle further includes a lug extending outward from a side of the rotating body away from the circle center of the rotating body. The rotating body includes a first portion having a maximum radius and a second portion having a minimum radius, and is configured to rotate around the rotating shaft between a state in which the first portion abuts against the yaw-axis vertical bar and a state in which the second portion abuts against the yaw-axis vertical bar when the lug is operated.

In some embodiments, the quick release mechanism further includes a screw inserted in the rotating shaft in a direction perpendicular to a side surface of the yaw-axis horizontal bar. The slider is connected to one end of the screw. The screw is configured to drive the slider to move between a position at which the slider is abutted between the yaw-axis vertical bar and the yaw-axis horizontal bar and a position at which the slider is released from the yaw-axis vertical bar and the yaw-axis horizontal bar.

In some embodiments, the yaw-axis vertical bar includes two clamping arms at a top end of the yaw-axis vertical bar, and the yaw-axis horizontal bar is arranged between the two clamping arms and on the top end of the yaw-axis vertical bar.

In some embodiments, each of the two clamping arms includes a first groove and a second groove spaced apart from each other on an inner surface of the clamping arm facing the other clamping arm. The yaw-axis horizontal bar includes a boss at a lower end of the yaw-axis horizontal bar. The boss is received in the second grooves of the two clamping arms. The slider includes a vertical block and a horizontal block connected to the vertical block and received in the first groove of one of the two clamping arms.

In some embodiments, the yaw-axis horizontal bar includes a recess on a side surface of the yaw-axis horizontal bar. The vertical block is received in the recess. The slider is configured to abut between the recess of the yaw-axis horizontal bar and the clamping arm when the center of gravity adjusting device is locked by the quick release mechanism.

In some embodiments, a bottom surface of the recess of the yaw-axis horizontal bar includes a slant surface, a bottom surface of the vertical block of the slider includes an inclined surface having a same inclination angle as the slant surface, and the inclined surface of the slider is configured to slide relative to the slant surface of the recess of the yaw-axis horizontal bar.

In some embodiments, the center of gravity adjusting device further includes a gear adjusting mechanism including a gear, a gear rotating shaft connected to the gear, and adjusting knobs arranged at two ends of the gear rotating shaft and configured to rotate the gear rotating shaft to rotate the gear. The yaw-axis horizontal bar includes a rack arranged at an upper surface of the yaw-axis horizontal bar. The gear engages with the rack and is configured to drive the yaw-axis horizontal bar to move relative to the yaw-axis vertical bar through the engagement with the rack.

In some embodiments, the gear adjusting mechanism further includes a gear fixing member fixed at a top end of the yaw-axis vertical bar. The gear fixing member includes a head cover and two side walls. The gear is received in an opening formed between the two side walls.

In some embodiments, the gimbal structure further includes a first motor mounted at a bottom end of the yaw-axis vertical bar. The first motor is configured to rotatably connect the support frame with the center of gravity adjusting device.

In some embodiments, the gimbal structure further includes a handheld frame and a second motor configured to rotatably connect the handheld frame with the center of gravity adjusting device. The yaw-axis vertical bar is arranged at one end of the yaw-axis horizontal bar and the second motor is mounted at another end of the yaw-axis horizontal bar away from the yaw-axis vertical bar.

In some embodiments, the handheld frame includes a horizontal rod and handles mounted on the horizontal rod.

In some embodiments, the handheld frame includes three handles, two of which are mounted at two ends of the horizontal rod, respectively, and another one of which is mounted at a middle portion of the horizontal rod.

Also in accordance with the present disclosure, there is provided a gimbal structure including a support frame and a gear adjusting mechanism. The support frame includes a roll-axis support, a yaw-axis vertical bar connected to the roll-axis support, and a yaw-axis horizontal bar carried on the yaw-axis vertical bar. The yaw-axis horizontal bar includes a rack arranged at an upper surface of the yaw-axis horizontal bar. The gear adjusting mechanism includes a gear, a gear rotating shaft connected to the gear, and adjusting knobs arranged at two ends of the gear rotating shaft and configured to rotate the gear rotating shaft to rotate the gear. The gear engages with the rack and is configured to drive the yaw-axis horizontal bar to move relative to the yaw-axis vertical bar through the engagement with the rack.

In some embodiments, the gear adjusting mechanism further includes a gear fixing member provided at a top end of the yaw-axis vertical bar. The gear fixing member includes a head cover and two side walls. The gear is received in an opening formed between the two side walls.

Also in accordance with the present disclosure, there is provided a gear adjusting mechanism including a gear, a gear rotating shaft connected to the gear, adjusting knobs provided at two ends of the gear rotating shaft and configured to rotate the gear rotating shaft to rotate the gear, and a gear fixing member. The gear fixing member includes a head cover and two side walls extending from the head cover. The gear is received in an opening formed between the two side walls. The gear rotating shaft is rotatably connected between the two side walls.

The gimbal structure according to embodiments of the present disclosure may employ a quick release mechanism to adjust the center of gravity adjusting device. In some embodiments, the yaw-axis horizontal bar may be locked to or released from the yaw-axis vertical bar of the support frame by manipulating the lug of the quick release mechanism. For example, when the center of gravity of the gimbal structure is to be fixed, a user may fasten the lug of the quick release mechanism, such that the slider of the quick release mechanism may abut against the clamping arm of the yaw-axis vertical bar and the yaw-axis horizontal bar to prevent a relative moment of the yaw-axis horizontal bar relative to the yaw-axis vertical bar. When the center of gravity of the gimbal structure is to be adjusted, the user may unfastened the lug of the quick release mechanism, such that the slider of the quick release mechanism may slide towards the yaw-axis horizontal bar to release the slider from the clamping arm of the yaw-axis vertical bar and the yaw-axis horizontal bar. The yaw-axis horizontal bar may be released from the yaw-axis vertical bar such that they are movable relative to each other. The center of gravity adjusting device may be locked and released by aforementioned quick release mechanism without the aid of additional tools. Therefore, the center of gravity adjusting device may timely adjust the center of gravity of the gimbal structure.

LIST OF REFERRALS

Gimbal structure 100
Support frame 10
Roll-axis support 12
Yaw-axis vertical bar 14
Clamping arm 141
First groove 1411
Second groove 1412
Yaw-axis horizontal bar 16
Upper surface 161
Lower surface 162
Side surface 163
Rack 164
Boss 165
Recess 166
Slant surface 167
First motor 17
Power supply device 18
Filming device 20
Center of gravity adjusting device 30
Gear adjusting mechanism 32
Gear fixing member 321
Head cover 3211
Side wall 3212
Opening 3213
Stepped hole 3214
Fastener 3215
Gear 322
Gear rotating shaft 323
Adjusting knob 324
Quick release mechanism 34 Quick release buckle 341
Rotating shaft 3411
Rotating body 3412 Lug 3413
Through-hole 3414
Screw 342
Slider 343
Horizontal block 3431
Vertical block 3432
Inclined surface 3433
Threaded hole 3434
Copper gasket 344
Silicone gasket 345
Second motor 36

Handheld frame 40
Horizontal rod 42
Handle 44

Embodiments of the present disclosure will be described in detail with reference to the drawings.

DETAILED DESCRIPTION OF THE EMBODIMENTS

Figure 1:
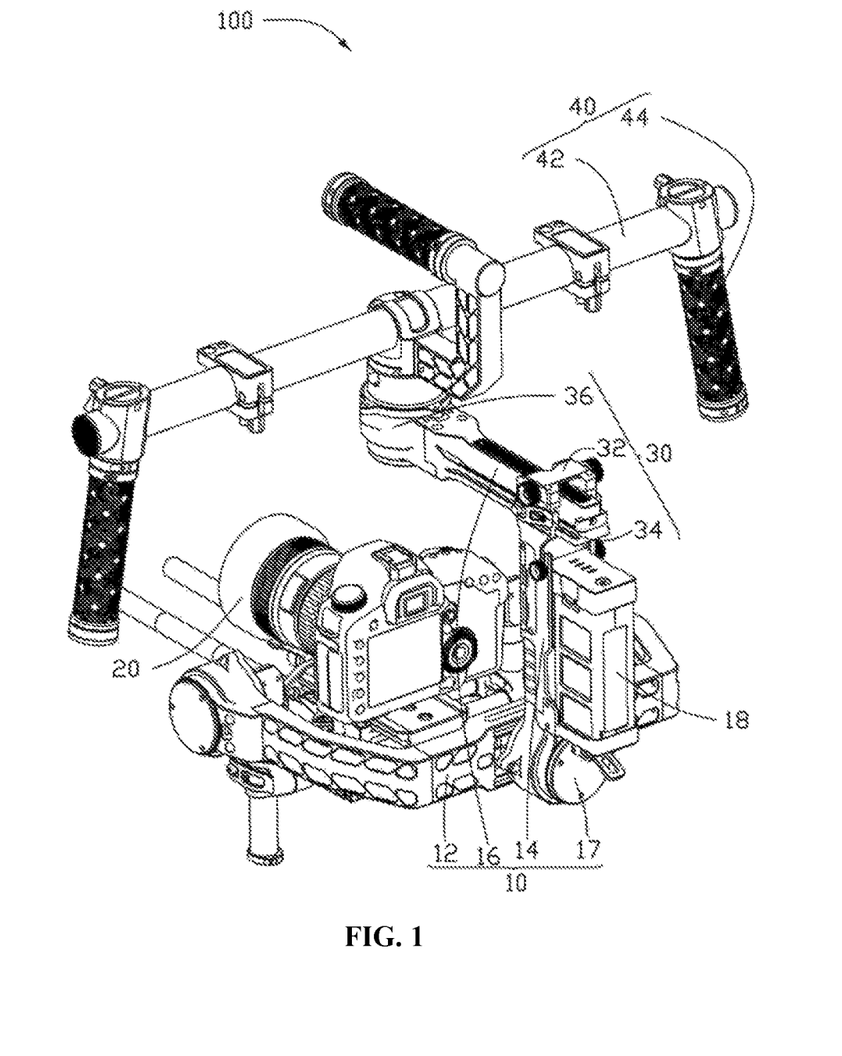
FIG. 1 is a perspective view of a gimbal structure according to an embodiment of the present disclosure.
Figure 2:
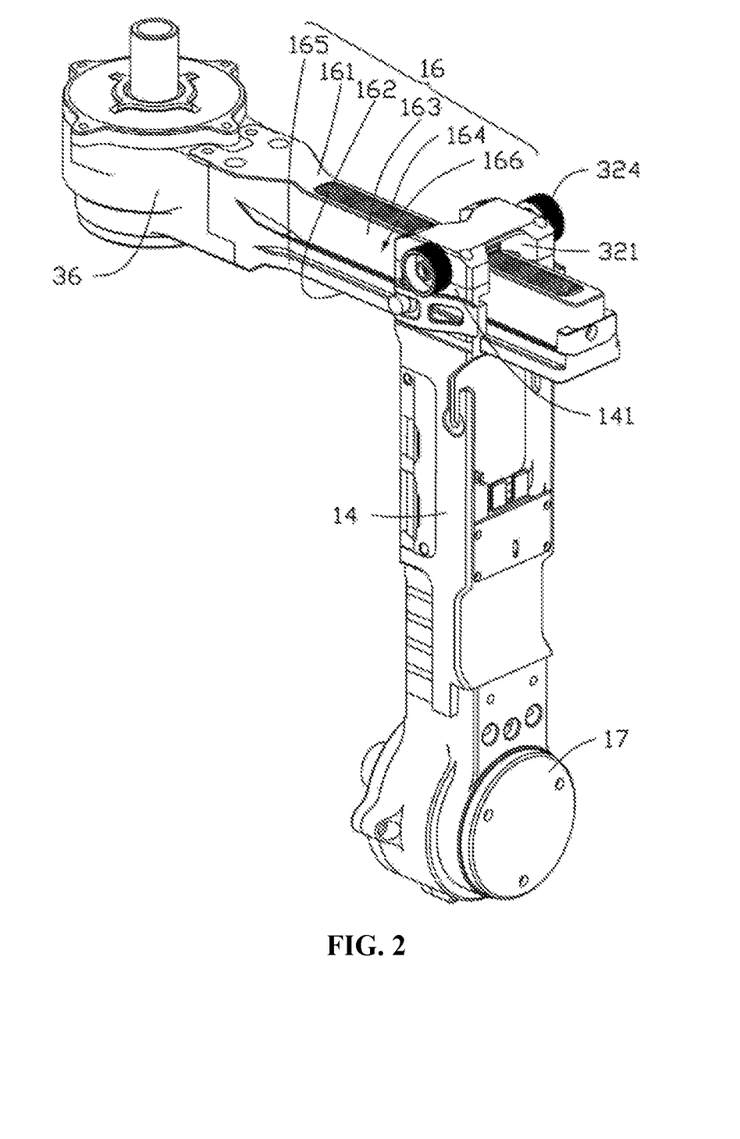
FIG. 2 is a perspective view showing a connection structure of a center of gravity adjusting device and a yaw-axis vertical bar of a support frame of the gimbal structure in FIG. 1.
Figure 3:
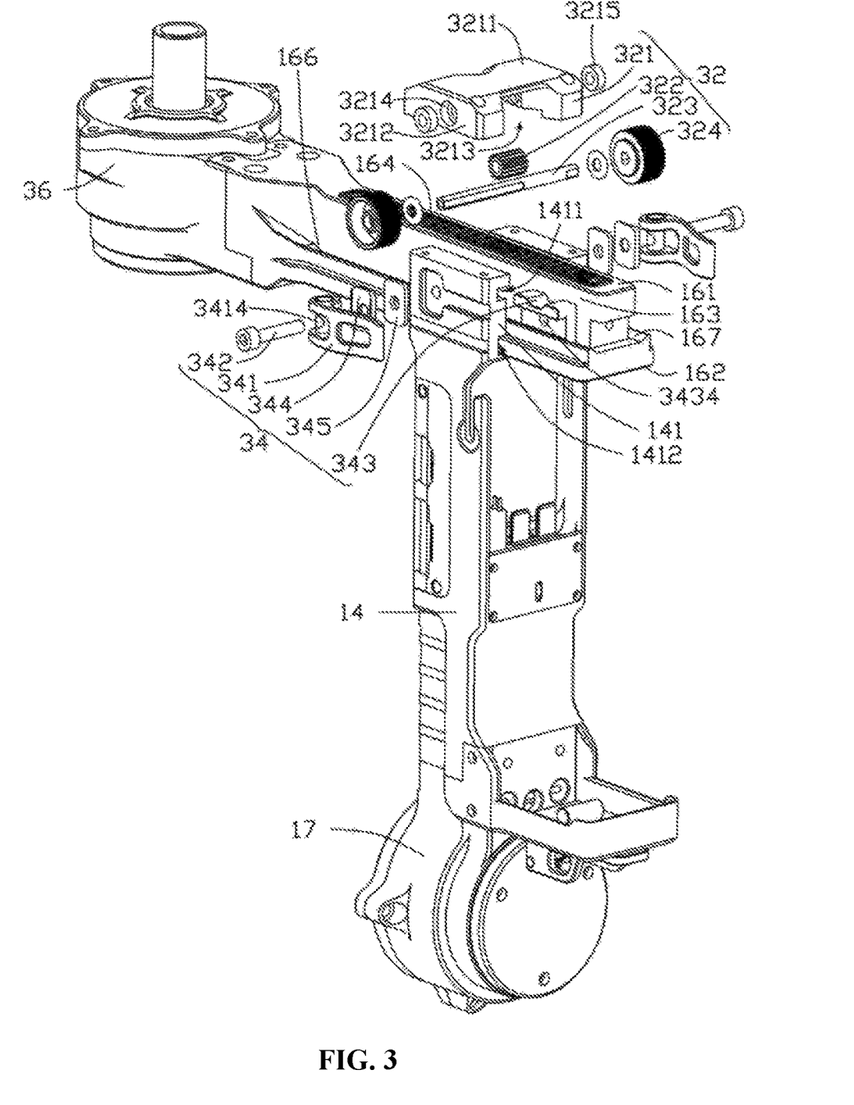
FIG. 3 is an exploded perspective view of the center of gravity adjusting device and the yaw-axis vertical bar of the support frame in FIG. 2.

Referring to FIGS. 1 to 3, a gimbal structure 100 according to an embodiment of the present disclosure may comprise a support frame 10 for mounting a filming device 20, a center of gravity adjusting device 30, and a handheld frame 40. The support frame 10 and the handheld frame 40 may be connected to each other through the center of gravity adjusting device 30. The center of gravity of the gimbal structure 100 may be adjusted by the center of gravity adjusting device 30.

In some embodiments, the support frame 10 may comprise a roll-axis support 12, a yaw-axis vertical bar 14, a yaw-axis horizontal bar 16, and a first motor 17 rotatably connecting the roll-axis support 12 and the yaw-axis vertical bar 14. The roll-axis support 12 may be provided at a lower side of the gimbal structure 100. The filming device 20 may be mounted in the roll-axis support 12. A plane of the roll-axis support 12 may be perpendicular to the yaw-axis vertical bar 14 in an initial state. A shooting angle of the filming device 20 in the initial state may be an initial viewing angle. A top end of the yaw-axis vertical bar 14 may be provided with two clamping arms 141, which are connected to the center of gravity adjusting device 30. The first motor 17 may be mounted at a bottom end of the yaw-axis vertical bar 14 and rotatably connected to the roll-axis support 12. A power supply device 18 may be provided on the yaw-axis vertical bar 14. The power supply device 18 may drive a rotating shaft of the first motor 17 to rotate, causing the roll-axis support 12 to rotate around a central axis of the first motor 17. When the roll-axis support 12 rotates, an angle of the roll-axis support 12 may change around the central axis of the first motor 17, such that a shooting angle of the filming device 20 mounted on the roll-axis support 12 may vary correspondingly.

In some embodiments, the clamping arms 141 may be formed on the top end of the yaw-axis vertical bar 14 and extend upward. The two clamping arms 141 may be spaced apart from each other. Each clamping arm 141 has an inner surface facing the other clamping arm 141. Two grooves, i.e., a first groove 1411 and a second groove 1412, may be provided on the inner surface of each of the clamping arms 141. The first groove 1411 and second groove 1412 may be spaced apart from each other. The first groove 1411 may be disposed distal to the yaw-axis vertical bar 14, and the second groove 1412 may be disposed proximal to the yaw-axis vertical bar 14.

Figure 4:
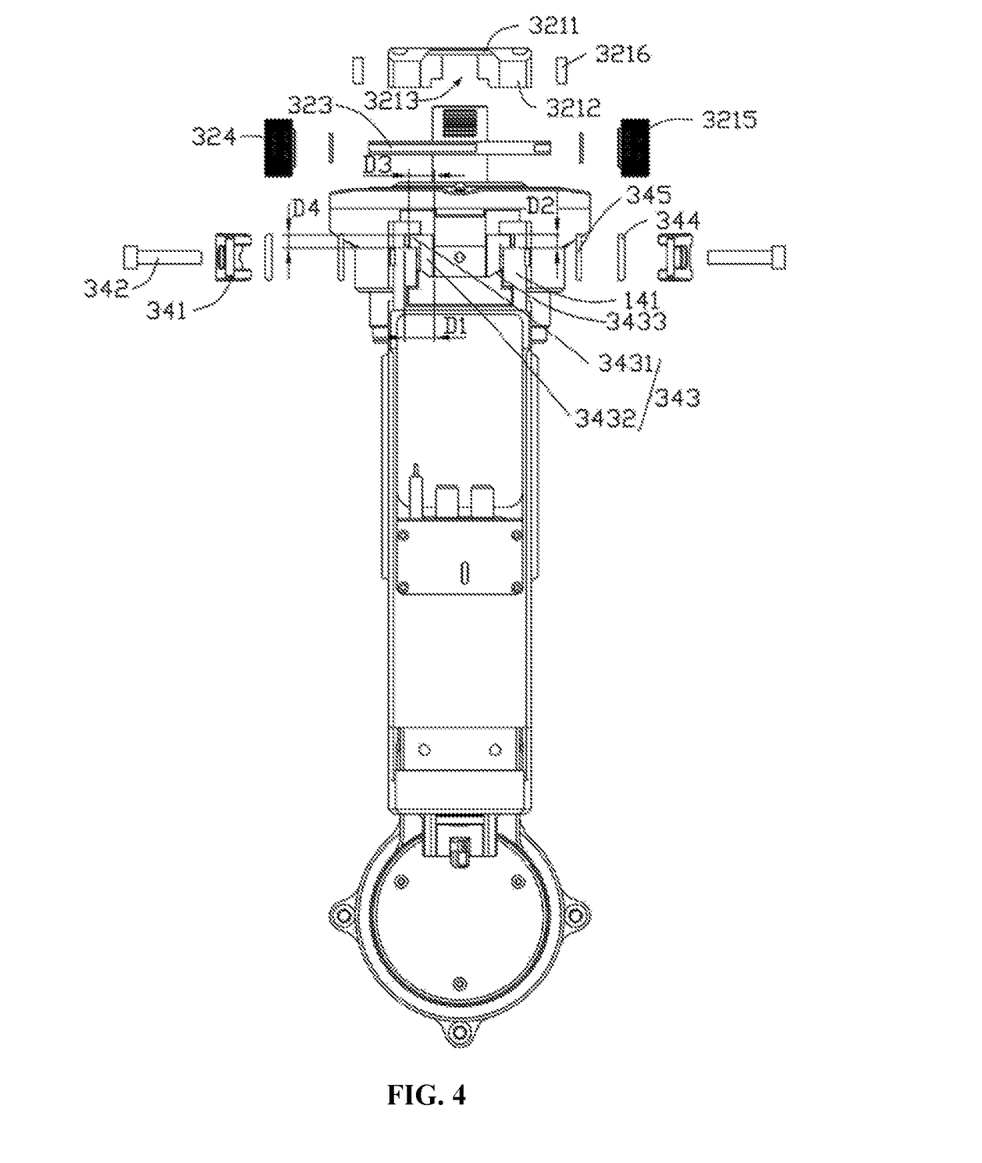
FIG. 4 is a rear view of the center of gravity adjusting device and the yaw-axis vertical bar of the support frame in FIG. 2.

The yaw-axis horizontal bar 16 may be connected to the yaw-axis vertical bar 14 of the support frame 10. In some embodiments, the yaw-axis horizontal bar 16 may be fitted with the clamping arms 141 at the top end of the yaw-axis vertical bar 14. The yaw-axis horizontal bar 16 may comprise an upper surface 161, a lower surface 162, and two side surfaces 163. The upper surface 161 may be parallel to the lower surface 162, and the two side surfaces 163 may be respectively connected to edges of the upper surface 161 and lower surface 162. The upper surface 161 may be provided with a toothed rack 164, also referred to as "rack 164," which is arranged along an extending direction of the yaw-axis horizontal bar 16. A bottom of the yaw-axis horizontal bar 16 may be provided with a boss 165 having a width larger than a distance between the two side surfaces 163. A recess 166 extending vertically from the upper surface 161 to the lower surface 162 may be provided on each of the two side surfaces 163 of the yaw-axis horizontal bar 16. A bottom surface of each of the recesses 166 may be a slant surface 167. An angle between a slant surface 167 and a corresponding side surface 163 may be an acute angle. In some embodiments, the angle between the slant surface 167 and the corresponding side surface 163 may be 60°. The yaw-axis horizontal bar 16 may be received between the two clamping arms 141 of the yaw-axis vertical bar 14. The lower surface 162 of the yaw-axis horizontal bar 16 may be carried on the yaw-axis vertical bar 14. The boss 165 of the yaw-axis horizontal bar 16 may be received in the second grooves 1412 of the two clamping arms 141. Each of the side surfaces 163 faces the first groove 1411 of one of the clamping arms 141. As shown in FIG. 4, a distance between the side surface 163 and a bottom of the corresponding first groove 1411 is designated as D1.

Referring to FIGS. 3 to 4, the center of gravity adjusting device 30 may comprise a gear adjusting mechanism 32 engagingly connected to the yaw-axis horizontal bar 16, a quick release mechanism 34 configured to tighten and loosen the gear adjusting mechanism 32, and a second motor 36 configured to pivotally connect the center of gravity adjusting device 30 to the handheld frame 40.

The gear adjusting mechanism 32 may be engagingly connected to the yaw-axis horizontal bar 16. The gear adjusting mechanism 32 may comprise a gear fixing member 321, a gear 322, a gear rotating shaft 323, and adjusting knobs 324. The gear fixing member 321 may be configured to connect to the gear rotating shaft 323 and to receive the gear 322, and may be secured to top ends of the clamping arms 141 of the yaw-axis vertical bar 14. The gear fixing member 321 may comprise a head cover 3211 and two side walls 3212. The two side walls 3212 may extend downward from opposing sides of the head cover 3211, thus forming an opening 3213 between the two side walls 3212 for receiving the gear 322. Each of the side walls 3212 may be provided with a stepped hole 3214. The two stepped holes 3214 may be disposed coaxially. Two ends of the gear rotating shaft 323 may be inserted in the stepped holes 3214, respectively, and may rotate in the stepped holes 3214. In some embodiments, the gear 322 may be assembled as described below. First, one end of the gear rotating shaft 323 may be inserted into the opening 3213 through the stepped hole 3214 formed on one of the side walls 3212 of the gear adjusting mechanism 32. Then, the gear 322 may be placed in the opening 3213 and the one end of the gear rotating shaft 323 is inserted into the gear 322. Next, the one end of the gear rotating shaft 323 may be further inserted into the stepped hole 3214 formed on the other one of the side walls 3212. Finally, fasteners 3215 may be fitted on the gear rotating shaft 323. The fasteners 3215 may be rotable in the stepped holes 3214 such that the gear rotating shaft 323 may be rotatably connected to the gear fixing member 321. Two ends of the gear rotating shaft 323 may be exposed from outer peripherals of the two side walls 3212. In some embodiments, two adjusting knobs 324 may be provided, which are respectively mounted on the two ends of the gear rotating shaft 323 which are exposed from the outer peripherals of the side walls 3212. The gear rotating shaft 323 may be rotated by rotating the adjusting knobs 324, to rotate the gear 322. Due to an engagement between the rack 164 of the yaw-axis horizontal bar 16 and the gear 322, a rotation of the gear 322 may cause the yaw-axis horizontal bar 16 to move back and forth in an extending direction of the rack 164.

In some embodiments, the quick release mechanism 34 may comprise a quick release buckle 341, a screw 342 connected to the quick release buckle 341, and a slider 343 connected to the screw 342.

Figure 5:
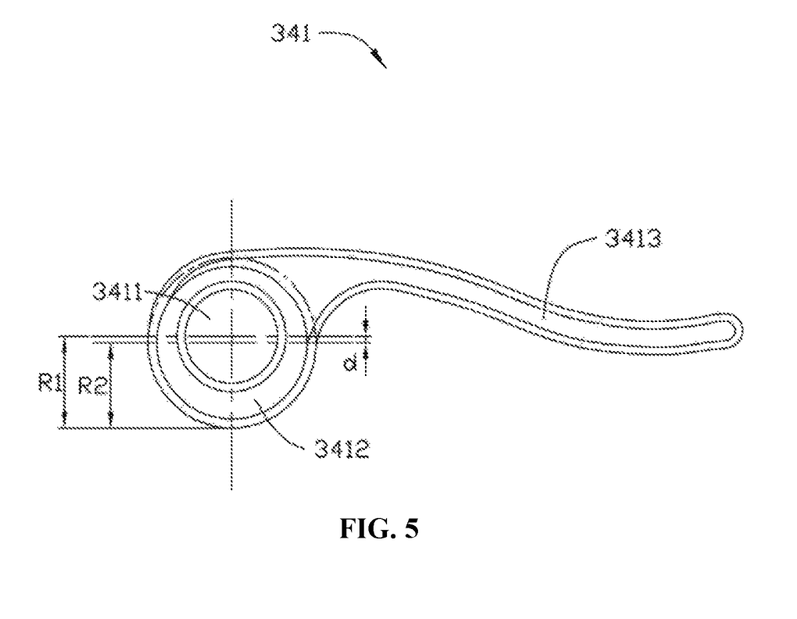
FIG. 5 is a top view of a quick release buckle of the center of gravity adjusting device in FIG. 4.

Referring to FIG. 5, the quick release buckle 341 may comprise a rotating shaft 3411, a rotating body 3412 and a lug 3413. The rotating body 3412 may be sleeved on an outer peripheral of the rotating shaft 3411. The rotating body 3412 may include a cylinder and be configured to be eccentric with the rotating shaft 3411. That is, a circle center of the rotating shaft 3411 may not coincide with a circle center of the rotating body 3412. The circle center of the rotating shaft 3411 (the top one of the two circle centers shown in FIG. 5) may deviate from the circle center of the rotating body 3412 (the bottom one of the two circle centers shown in FIG. 5) by a distance d, such that the rotating body 3412 may have a maximum radius R1 and a minimum radius R2, where R1>R2. The lug 3413 may extend outward from a side of the rotating body 3412 away from the circle center of the rotating body 3412. In some embodiments, the lug 3413 may be formed in a streamlined shape. An extending direction of the lug 3413 may be approximately perpendicular to a virtual line connecting the circle center of the rotating shaft 3411 and the circle center of the rotating body 3412, i.e., approximately perpendicular to a virtual line on which the maximum radius R1 of the rotating body 3412 lies. The rotating shaft 3411 may be provided with a through-hole 3414 through which the screw 342 may be inserted (as shown in FIG. 4). When the lug 3413 is manipulated, the rotating body 3412 may rotate around the rotating shaft 3411 such that the rotating body 3412 may rotate from the maximum radius (when the virtual line connecting the circle center of the rotating shaft 3411 and the circle center of the rotating body 3412, i.e., the vertical dashed line in FIG. 5, is approximately parallel to a longitudinal axis of the screw 342) to the minimum radius (when the virtual line connecting the circle center of the rotating shaft 3411 and the circle center of the rotating body 3412 is approximately perpendicular to the longitudinal axis of the screw 342).

Referring again to FIGS. 3 and 4, the slider 343 may be approximately in a "7" shape and comprise a horizontal block 3431 and a vertical block 3432 which are approximately perpendicular to each other. The horizontal block 3431 may have a width D3. The width of the horizontal block 3431 may be smaller than the distance between a side surface 163 of the yaw-axis horizontal bar 16 and the bottom of a corresponding first groove 1411, i.e., D3<D1. As such, the slider 343 may be able to move in its width direction for a certain distance. The horizontal block 3431 may have a height D4, which may be less than a height D2 of the first groove 1411, i.e., D4<D2. As such, the slider 343 may be able to move in its height direction for a certain distance. A bottom surface of the vertical block 3432 may be an inclined surface 3433 having the same inclination angle as that of the slant surface 167 of the recess 166 of the yaw-axis horizontal bar 16. The slider 343 may be displaced in the width and height directions via the sliding of the inclined surface 3433 in the recess 166 of the yaw-axis horizontal bar 16. The vertical block 3432 may be provided with a threaded hole 3434 through which the screw 342 of the quick release mechanism 34 may be inserted to connect the slider 343 with the quick release buckle 341. During the assembly of the quick release mechanism 34, the vertical block 3432 of a slider 343 may be attached to the corresponding side surface 163 of the yaw-axis horizontal bar 16, and the horizontal block 3431 may be received in the first groove 1411 of the corresponding clamping arm 141 of the yaw-axis vertical bar 14. Then, the screw 342 of the quick release mechanism 34 may be successively inserted through the quick release buckle 341 and the clamping arm 141, and finally be threadedly engaged with the slider 343 in order to secure the quick release buckle 341 on one side of the clamping arm 141. A number of gaskets may be provided between the quick release buckle 341 and the clamping arm 141 to facilitate the manipulating of the quick release mechanism 34 and to reduce a friction between components. In some embodiments, a copper gasket 344 and a silicone gasket 345 may be successively provided between the quick release buckle 341 and the clamping arm 141. The side of the copper gasket 344 facing the rotating body 3412 of the quick release buckle 341 may include a curved surface.

To change the quick release mechanism 34 to a tightened state, the quick release buckle 341 of the quick release mechanism 34 may be manipulated to be placed at one side of the clamping arm 141 of the yaw-axis vertical bar 14. In this state, a portion of the rotating body 3412 of the quick release buckle 341 that has the maximum radius may abut against the clamping arm 141, such that the slider 343 is driven by the screw 342 of the quick release mechanism 34 to abut against a corresponding clamping arm 141. In some embodiments, the inclined surface 3433 of the slider 343 may slide outward along the slant surface 167 of the recess 166 of the yaw-axis horizontal bar 16 until the vertical block 3432 of the slider 343 abuts against the clamping arm 141 and a top end of the horizontal block 3431 abuts against an upper wall of the first groove 1411 of the clamping arm 141. Under this state, the slider 343 may be locked onto the clamping arm 141 such that the yaw-axis horizontal bar 16 may be fixed with the yaw-axis vertical bar 14.

To change the quick release mechanism 34 to a loosened state, the lug 3413 of the quick release buckle 341 of the quick release mechanism 34 may be manipulated to be approximately perpendicular to the clamping arm 141 of the yaw-axis vertical bar 14. That is, the portion of the rotating body 3412 of the quick release buckle 341 that abuts against the clamping arm 141 may shift gradually from the portion having the maximum radius to a portion having the minimum radius, such that the slider 343 may be driven by the screw 342 of the quick release mechanism 34 to slide inward. In some embodiments, the inclined surface 3433 of the slider 343 may slide inward along the slant surface 167 of the recess 166 of the yaw-axis horizontal bar 16 to loosen the vertical block 3432 of the slider 343 from the slant surface 167 of the recess 166 of the yaw-axis horizontal bar 16 and loosen the horizontal block 3431 from the upper wall of the first groove 1411 of the clamping arm 141. In the loosened state, the horizontal block 3431 of the slider 343 may not abut against the clamping arm 141, and the vertical block 3432 may not abut against the yaw-axis horizontal bar 16, such that the slider 343 may be released from the clamping arm 141 and the yaw-axis horizontal bar 16. In the loosened state, the gear 322 may engage with the rack 164 on the yaw-axis horizontal bar 16 by rotating the adjusting knobs 324 of the gear adjusting mechanism 32. By virtue of the engagement, the yaw-axis horizontal bar 16 may slide in the clamping arms 141, to adjust the center of gravity of the entire gimbal structure 100.

Another end of the center of gravity adjusting device 30 may be connected to the second motor 36 through which and the handheld frame 40 may be rotatably connected to the center of gravity adjusting device 30. In some embodiments, the handheld frame 40 may comprise a horizontal rod 42 and a plurality of handles 44 mounted on the horizontal rod 42. In some embodiments, three handles 44 may be provided, two of which may be provided at two ends of the horizontal rod 42, respectively, and the third handle 44 may be provided at a middle portion of the horizontal rod 42. The horizontal rod 42 may be rotatably connected to the center of gravity adjusting device 30 through the second motor 36.

The gimbal structure 100 according to embodiments of the present disclosure may employ the quick release mechanism 34 to adjust the center of gravity adjusting device 30. In some embodiments, the yaw-axis horizontal bar 16 may be locked to or released from the yaw-axis vertical bar 14 of the support frame 10 by manipulating the lug 3413 of the quick release mechanism 34. For example, when the center of gravity of the gimbal structure 100 needs to be fixed, the lug 3413 of the quick release mechanism 34 may be fastened such that the slider 343 of the quick release mechanism 34 may abut against the clamping arm 141 of the yaw-axis vertical bar 14 and the yaw-axis horizontal bar 16 to prevent a relative moment of the yaw-axis horizontal bar 16 relative to the yaw-axis vertical bar 14. When the center of gravity of the gimbal structure 100 needs to be adjusted, the lug 3413 of the quick release mechanism 34 may be unfastened, such that the slider 343 of the quick release mechanism 34 may slide towards the yaw-axis horizontal bar 16 to release the slider 343 from the clamping arm 141 of the yaw-axis vertical bar 14 and the yaw-axis horizontal bar 16. The yaw-axis horizontal bar 16 may be released from the yaw-axis vertical bar 14 such that they may move relative to each other. The center of gravity adjusting device 30 may be locked and released by aforementioned quick release mechanism 34 without the need for additional tools. Therefore, the center of gravity adjusting device 30 may timely adjust the center of gravity of the gimbal structure 100. Furthermore, the gear adjusting mechanism 32 may be further employed in embodiments of the present disclosure. The yaw-axis horizontal bar 16 may be moved back and forth in the arrangement direction of the rack 164 by an engagement between the gear 322 and the rack 164. A precise adjustment of the center of gravity of the gimbal structure 100 may be achieved without relying on an operator's experience or intuition.

Embodiments of the present disclosure may further provide a gimbal structure, which may comprise a support frame and a gear adjusting mechanism. The support frame may comprise a roll-axis support, a yaw-axis vertical bar, and a yaw-axis horizontal bar carried on the yaw-axis vertical bar. The gear adjusting mechanism may comprise a gear, a gear rotating shaft connecting to the gear, and adjusting knobs arranged at two ends of the gear rotating shaft. An upper surface of the yaw-axis horizontal bar may be provided with a rack with which the gear may engage. The gear may be rotated by rotating the adjusting knobs to move the yaw-axis horizontal bar relative to the yaw-axis vertical bar.

In some embodiments, the gear adjusting mechanism may further comprise a gear fixing member which is fixed at a top end of the yaw-axis vertical bar. The gear fixing member may comprise a head cover and two side walls. An opening may be formed between the two side walls, and the gear may be received in the opening.

Connection of the gear adjusting mechanism with other components of the gimbal structure are described in the aforementioned embodiments and drawings.

It may be appreciated that various modifications and variations may be possible to those having ordinary skill in the art based on the technical concept of the present disclosure, and all these modifications and variations shall fall into the scope of the invention as defined by the appended claims.

What is claimed is:

1. A quick release mechanism for a gimbal comprising:
   a rotating member configured to be arranged on a first side of a first gimbal support frame of the gimbal;
   a slider configured to be arranged on a second side of the first gimbal support frame that is opposite to the first side, and between the first gimbal support frame and a second gimbal support frame of the gimbal; and
   a screw connected with the rotating member, wherein the screw:
      penetrates the first gimbal support frame;
      drives the slider to move in a first direction to abut between the first gimbal support frame and the second gimbal support frame, so as to lock the first gimbal support frame and the second gimbal support frame; and
      drives the slider to move in a second direction opposite to the first direction to be released from the first gimbal support frame and the second gimbal support frame, so as to unlock the first gimbal support frame and the second gimbal support frame.

2. The quick release mechanism of claim 1, wherein the slider includes:
   a first block; and
   a second block connected to the first block at an angle larger than 0 degrees.

3. The quick release mechanism of claim 2, wherein a surface of the first block of the slider includes an inclined surface configured to abut the second gimbal support frame.

4. The quick release mechanism of claim 1, wherein the rotating member is configured to:
   rotate in a first rotation direction to cause the screw to drive the slider to move in the first direction; and
   rotate in a second rotation direction to cause the screw to drive the slider to move in the second direction.

5. The quick release mechanism of claim 1, wherein the rotating member includes:
   a rotating shaft having a cylindric structure; and
   a rotating body having a cylindric structure and sleeved on an outer peripheral of the rotating shaft, a circle center of the rotating body being spaced apart from a circle center of the rotating shaft, the rotating body being configured to rotate relative to the rotating shaft to drive the screw to move.

6. The quick release mechanism of claim 5, wherein:
   the rotating member further includes a lug extending outward from a side of the rotating body away from the circle center of the rotating body;
   the rotating body includes a first portion having a maximum radius and a second portion having a minimum radius; and
   the rotating body is configured to, in response to the lug being operated, rotate around the rotating shaft between a first state in which the first portion abuts against the portion of the first gimbal support frame and a second state in which the second portion abuts against the portion of the first gimbal support frame.

7. The quick release mechanism of claim 6, wherein:
   the rotating shaft includes a through hole extending along a direction approximately perpendicular to a longitudinal direction of the rotating shaft;
   the screw is inserted in the through hole; and the screw is configured to pull the slider to lock the slider when the rotating body is in the first state and release the slider to unlock the slider when the rotating body is in the second state.

8. The quick release mechanism of claim 1, wherein the screw is threadedly engaged with the slider.

9. A gimbal comprising:
a first gimbal support frame;
a second gimbal support frame configured to move relative to the first gimbal support frame to adjust a center of gravity of the gimbal; and
a quick release mechanism including:
   a rotating member arranged on a first side of the first gimbal support frame;
   a slider arranged on a second side of the first gimbal support frame that is opposite to the first side, and between the first gimbal support frame and the second gimbal support frame; and
   a screw connected with the rotating member, wherein the screw:
      penetrates the first gimbal support frame;
      drives the slider to move in a first direction to abut between the first gimbal support frame and the second gimbal support frame, so as to lock the first gimbal support frame and the second gimbal support frame; and
      drives the slider to move in a second direction opposite to the first direction to be released from the first gimbal support frame and the second gimbal support frame, so as to unlock the first gimbal support frame and the second gimbal support frame.

10. The gimbal of claim 9, wherein the slider includes:
a first block; and
a second block connected to the first block at an angle larger than 0 degrees.

11. The gimbal of claim 10, wherein a surface of the first block of the slider includes an inclined surface configured to abut the second gimbal support frame.

12. The gimbal of claim 10, wherein:
the first gimbal support frame includes a groove on the second side; and
the first block is received in the groove.

13. The gimbal of claim 12, wherein:
a width of the first block is smaller than a width of the groove; and
the first block is configured to move in a width direction of the groove.

14. The gimbal of claim 9, wherein:
the first gimbal support frame includes two clamping arms; and
the second gimbal support frame is partially accommodated between the two clamping arms.

15. The gimbal of claim 14, wherein:
the two champing arms are configured to be arranged at one end of the first gimbal support frame;
each of the two clamping arms includes a groove on a side of the each of the two clamping arms; and
each side of the second gimbal support frame includes a boss matching the groove and configured to slide along surfaces of the groove.

16. The gimbal of claim 9, wherein the rotating member is configured to:
rotate in a first rotation direction to cause the screw to drive the slider to move in the first direction; and
rotate in a second rotation direction to cause the screw to drive the slider to move in the second direction.

17. The gimbal of claim 9, wherein the rotating member includes:
a rotating shaft having a cylindric structure; and
a rotating body having a cylindric structure and sleeved on an outer peripheral of the rotating shaft, a circle center of the rotating body being spaced apart from a circle center of the rotating shaft, the rotating body being configured to rotate relative to the rotating shaft to drive the screw to move.

18. The gimbal of claim 17, wherein:
the rotating member further includes a lug extending outward from a side of the rotating body away from the circle center of the rotating body;
the rotating body includes a first portion having a maximum radius and a second portion having a minimum radius; and
the rotating body is configured to, in response to the lug being operated, rotate around the rotating shaft between a first state in which the first portion abuts against the portion of the first support frame and a second state in which the second portion abuts against the portion of the first support frame.

19. The gimbal of claim 18, wherein:
the rotating shaft includes a through hole extending along a direction approximately perpendicular to a longitudinal direction of the rotating shaft;
the screw is inserted in the through hole; and
the screw is configured to pull the slider to lock the slider when the rotating body is in the first state and release the slider to unlock the slider when the rotating body is in the second state.

20. The gimbal of claim 9, wherein the screw is threadedly engaged with the slider.

* * * * *